Figure 1:
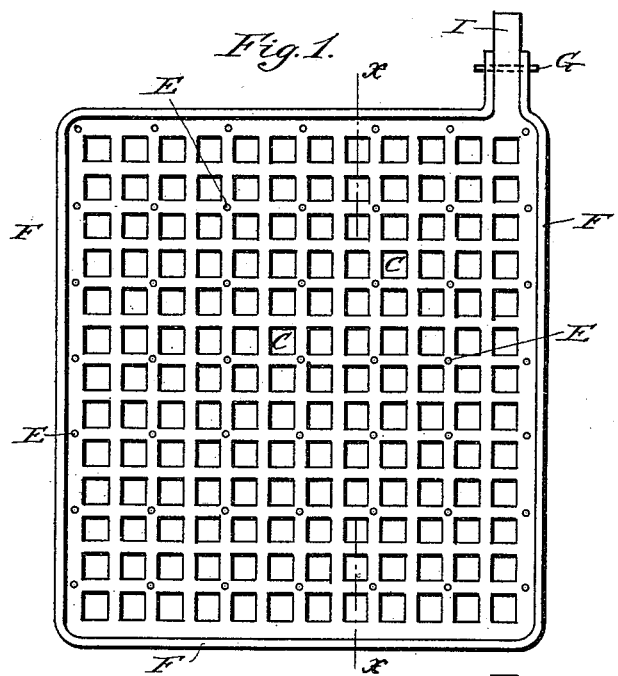

(No Model.) 2 Sheets—Sheet 1.
A. E. WOOLF.
SECONDARY BATTERY PLATE.

No. 440,216. Patented Nov. 11, 1890.

WITNESSES:
D. C. Renoch.
F. C. Smith.

INVENTOR
Albert E. Woolf
BY Phillips Abbott
his ATTORNEY (No Model.) 2 Sheets—Sheet 2.
A. E. WOOLF.
SECONDARY BATTERY PLATE.
No. 440,216. Patented Nov. 11, 1890.
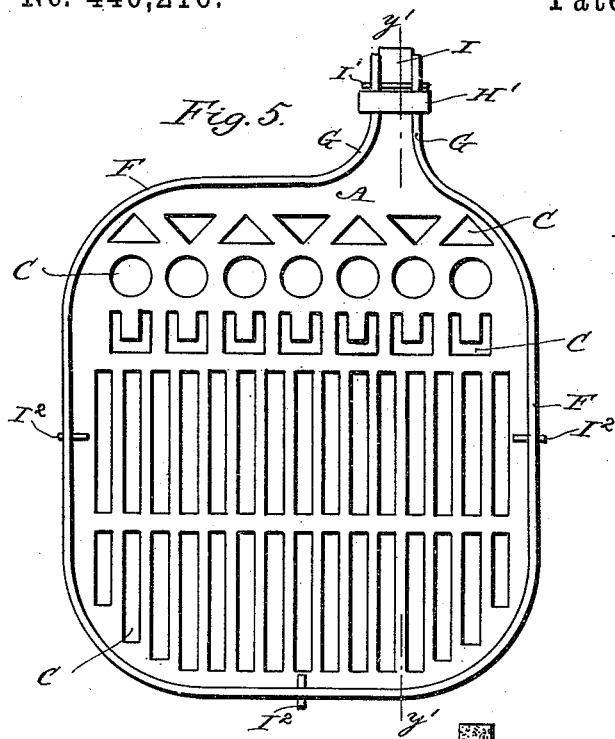
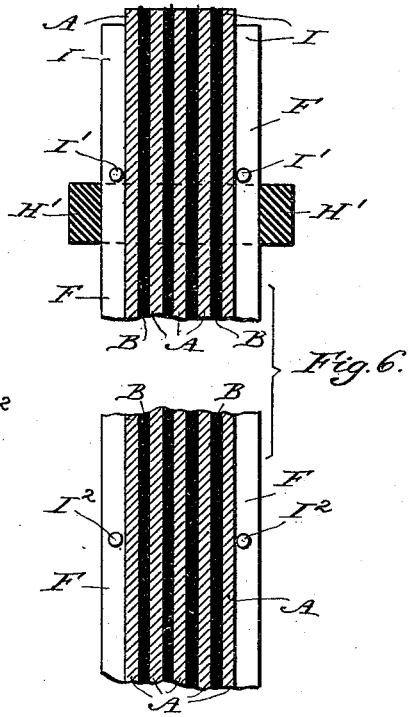
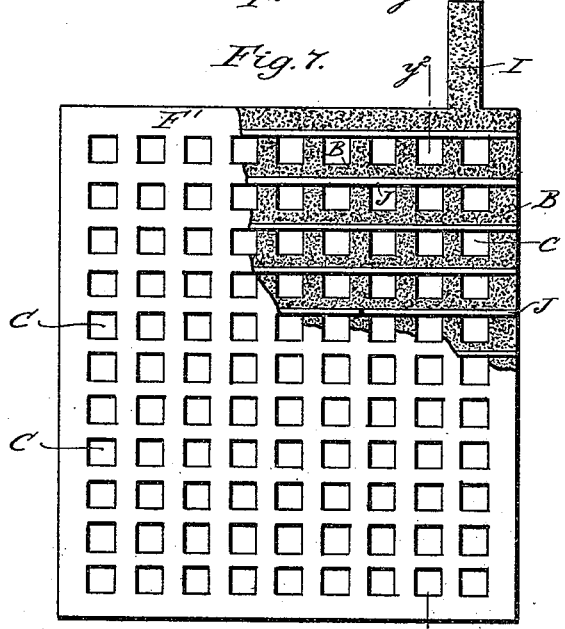
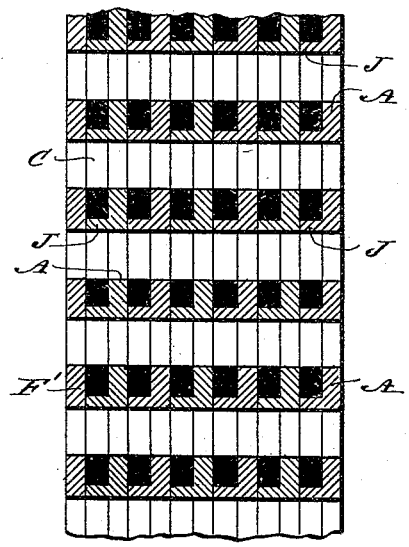
WITNESSES:
D. C. Reusch.
F. C. Smith.
INVENTOR
Albert E. Woolf
BY Phillips Abbott
his ATTORNEY

UNITED STATES PATENT OFFICE.

ALBERT E. WOOLF, OF NEW YORK, N. Y.

SECONDARY-BATTERY PLATE.

SPECIFICATION forming part of Letters Patent No. 440,216, dated November 11, 1890.

Application filed February 10, 1890. Serial No. 339,840. (No model.)

*To all whom it may concern:*

Be it known that I, ALBERT E. WOOLF, a citizen of the United States, and a resident of New York, in the county of New York and State of New York, have invented certain new and useful Secondary-Battery Plates, of which the following is a specification.

My invention relates to improvements in battery plates or electrodes for secondary batteries; and it consists in building up the plates from alternating layers, of supports for the active material and active material in conjunction therewith, and in perforating the supports and the active material, whereby the liquid of the cell is allowed to circulate freely through the electrode.

My invention also relates to means whereby I protect and support the electrodes on all sides, whereby their durability and ability to withstand shock is very greatly increased.

In the drawings the same reference-letters indicate the same parts in all the figures.

Figure 2:
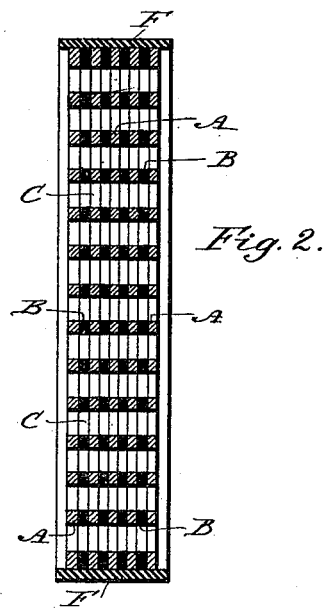
Figure 3:
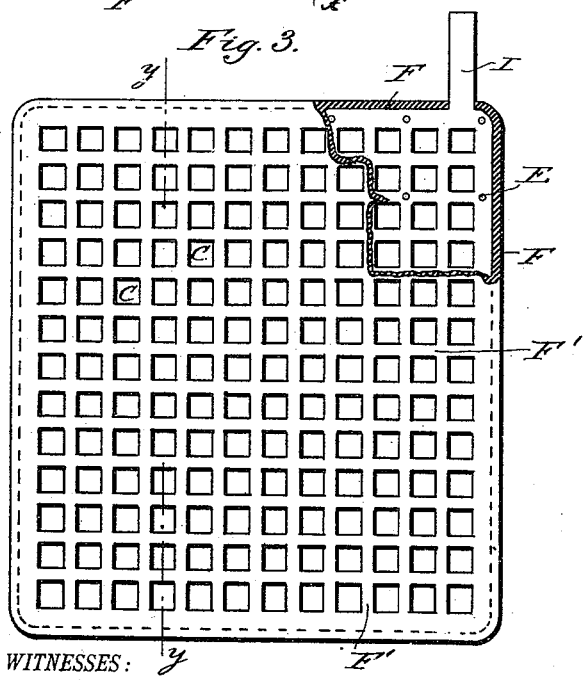
Figure 4:
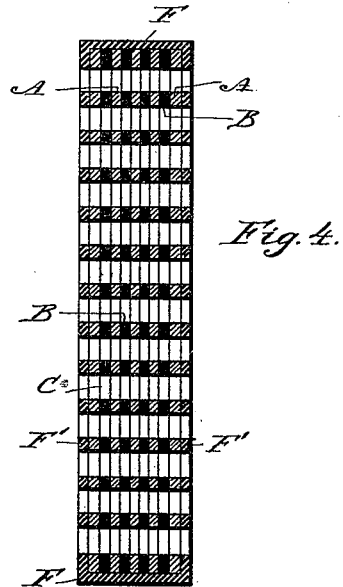

Figure 1 illustrates a side plan view of one of my electrodes. Fig. 2 illustrates a vertical section of the same on the line $x\ x$ of Fig. 1. Fig. 3 illustrates a side plan view of one of my electrodes provided with the envelope or casing of supporting material. Fig. 4 illustrates a vertical section of the electrode and its supporting-case, shown in Fig. 3 on the line $y\ y$ of that figure. Fig. 5 illustrates a plan view of an electrode, showing a pliable edgewise support or band. Fig. 6 illustrates a vertical section of the electrode shown in Fig. 5 on the line $y'\ y'$ of that figure, enlarged. Fig. 7 illustrates a side view of one of my electrodes, having a side-supporting case and ledges for the vertical support of the active material. Fig. 8 is a vertical cross-section on the line $y^2\ y^2$ of Fig. 7.

A A, &c., are plates or pieces of any material suitable for use in battery-plates of the kind stated as a support or base for the active material, and B B are layers of any suitable active material. The active material is placed between the several supports A in any preferred manner, and when the desired number of supports and layers of active material have been superposed upon each other they are put into any suitable press or otherwise subjected to pressure, whereby the active material is brought into intimate contact with the surfaces of the supports. I then perforate the resulting compound plate or electrode, composed of the supports and active material, in any preferred manner by making numerous holes C C through it from side to side. Of course the perforating may be done all at once, or the supports and the active material may be perforated at separate operations. These holes constitute open passage-ways for free circulation of the liquid of the cell. By this means I expose a large area of the support and active material to the solution. I prefer that the holes should be square, because their interior surfaces then are of larger area than if of other shape. This is not essential, however. They may be round or of such other form as preferred. (See Fig. 5, in which I show some other forms of perforation.)

In order to prevent or control the buckling action of the electrode or the tendency of the several pieces or supports to separate, spring apart, or bend, I sometimes pass rivets E E through the electrodes from side to side. They may be of the same material as that composing the supports or of any other suitable material either such as will be acted on by the solution or the current or not.

F is a band with which I surround the edges of the electrode. It is preferably, but not necessarily, made of some material which will not be acted on by the solution—as, for instance, hard rubber—because its special function is to support and hold the electrode, sustaining it on all its edges so that when it has attained its foraminated condition consequent upon formation and use it will be better supported and preserved, in a like manner to the operation of the supporting-band patented to me in United States Letters Patent granted to me December 31, 1889, No. 418,483. The ends of the band F may be confined in any preferred manner. I have found that a good way is to turn them upwardly and rivet them together, as seen at G, Fig. 1.

I are laterally-extending portions of the electrode-supports at which the electrical connections can be easily made. I do not limit myself to this method of making the connections, however.

In Figs. 3 and 4 I show an electrode entirely surrounded by a casing or wrapper, whereby it will be supported on all sides. F' is the envelope or casing. It is attached to the band F on the edges of the electrode in any preferred manner. The electrode may be slipped into the casing after it (the electrode) has been made, if desired, one side of the case being left open. Of course the perforation or holes C extend through the side casings F', as shown.

In Figs. 5 and 6 I illustrate a pliable supporting-band F. The electrode is preferably rounded at its corners, as shown, and the band F is fitted to it and at the upwardly-extending part. Where the electrical connections are made, I curve the band, as shown at G G. It will be apparent that should the electrode change its proportions during the process of forming or charging the band will yield, owing to its curvature or outline. In other words, the curve at G G will flatten somewhat, thus allowing for the expansion. In this form of my invention I prefer to confine the band by a collar H', (see Figs. 5 and 6,) which fits over the ends of the band F and is held in place by pins I' I', which pass through the band. This, however, is not essential. I prefer to confine this plate within the band and prevent lateral displacement by pins $I^2$ $I^2$, passing through the band and at the sides of the supports. They will not always be necessary.

In Figs. 7 and 8 I show a construction of the supports for the active material in which it rests on ledges J J, formed on the supports. The holes for the circulation of the liquid may be made immediately under the respective ledges, so that there shall be no possibility of any dropping of the active material from above, or they may be made elsewhere, as preferred. I show in Fig. 7 the lateral exterior supporting case or envelope without the edgewise supporting-band.

I claim—

1. An electrode comprising, essentially, a plurality of supports for active material, the supports being conductors of electricity and a layer of mechanically-applied active material between and in contact with the surfaces of adjoining supports, and continuous open passages for the liquid of the cell made through the supports and through the active material, substantially as set forth.

2. An electrode comprising, essentially, a plurality of supports for active material and active material in conjunction therewith, and an edgewise sustaining-band, substantially as set forth.

3. An electrode comprising, essentially, a plurality of supports for active material, active material in conjunction therewith, passages for the battery liquid through the supports and through the active material, and an edgewise sustaining-band, substantially as set forth.

4. An electrode comprising, essentially, a plurality of supports for the active material, active material in conjunction therewith, passages for the battery liquid through the supports and through the active material, and a pervious lateral casing, substantially as set forth.

5. An electrode comprising, essentially, a plurality of supports for the active material, active material in conjunction therewith, passages for the battery liquid through the supports and through the active material, and a yielding support or band for the edge of the electrode, substantially as set forth.

6. An electrode comprising, essentially, a support for the active material, having ledges upon which the active material rests, and passages for the battery liquid through the support and through the active material, substantially as set forth.

Signed at New York, in the county of New York and State of New York, this 1st day of February, A. D. 1890.

ALBERT E. WOOLF.

Witnesses:
PHILLIPS ABBOTT,
F. C. SMITH.